Jan. 2, 1968  J. P. M. D'HAENS  3,360,992
HYGROMETER PROBE
Filed Oct. 8, 1964
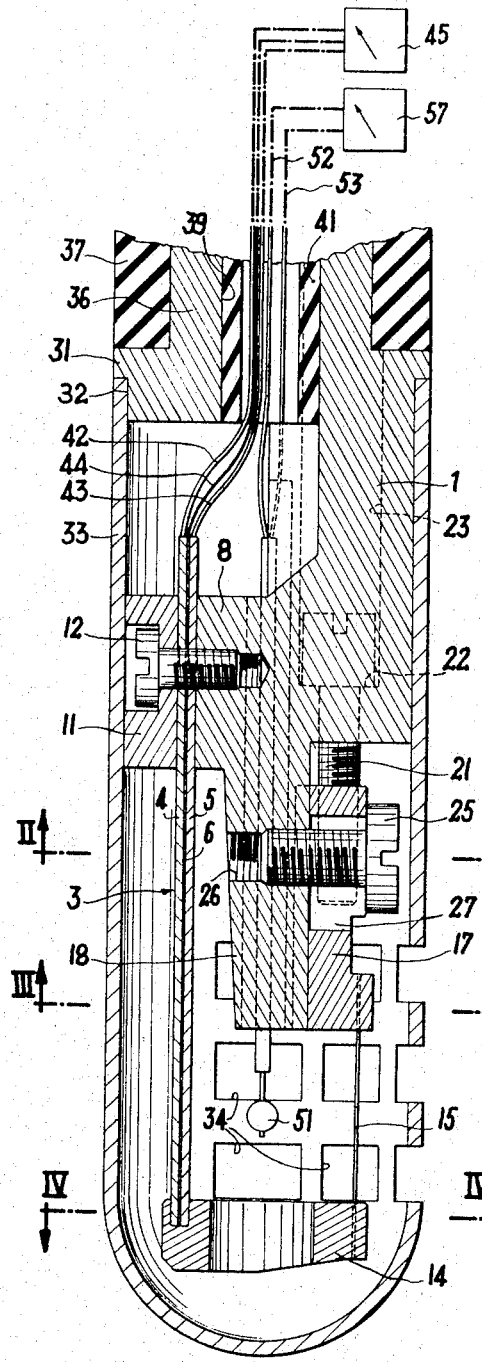
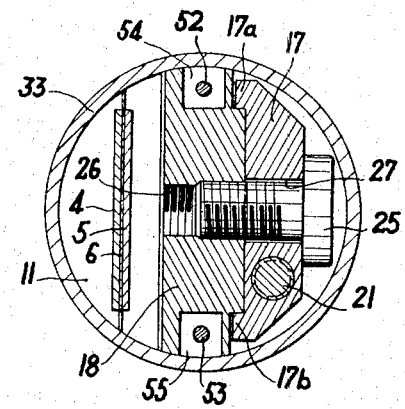
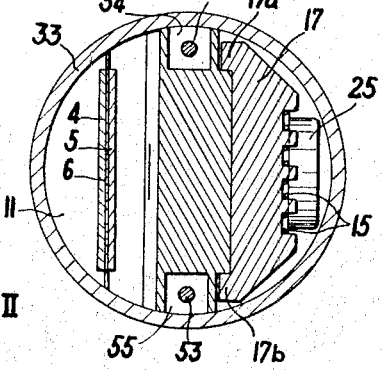
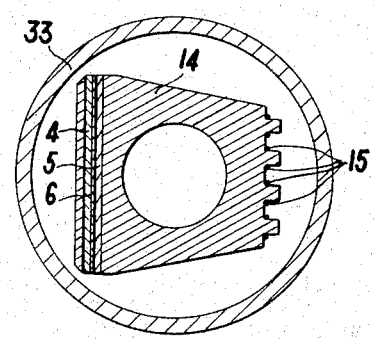

United States Patent Office 3,360,992
Patented Jan. 2, 1968

3,360,992
HYGROMETER PROBE
Joseph Paul Mariette d'Haens, Anvers, Belgium, assignor to Etablissements Jules Richard, Paris, France, a company of France
Filed Oct. 8, 1964, Ser. No. 402,516
Claims priority, application Belgium, Oct. 11, 1963, 43,046, Patent 638,519
9 Claims. (Cl. 73—337.5)

ABSTRACT OF THE DISCLOSURE

A hygrometer probe which includes the combination with a support of at least one elongated filiform hygroscopic element capable of changing its length with changes in the degree of humidity to which it is exposed, one end of such element being attached to the support, a strain gauge unit capable of giving an indication of variations in flexional strain having one end attached to the support and means interconnecting the other end of the filiform element and the other end portion of the strain gauge unit whereby variations in length of the filiform element responsive to atmospheric humidity will cause a flexing of the strain gauge unit, thereby giving indication of such variations.

---

This invention relates to hygrometers, that is devices for indicating the moisture content of an atmosphere, and more especially absortpion hygrometers.

An absorption hygrometer uses as the sensitive element therein a filiform hygroscopic element such as an organic fibre or hair, capable of absorbing moisture from the surrounding medium and varying appreciably in length with the amount of moisture absorbed so as to indicate by its length variations the variations in the moisture content of said medium. Usually the length variations of the hygroscopic element have been amplified through leverage and made to actuate an indicator pointer on a dial.

Conventional absorption hygrometers are advantageous from the standpoint of simplicity and compactness of the sensitive unit therein, but have generally lacked accuracy and were unsuitable for use as precision instruments. Moreover the mechanical movement amplifying leverages were complicated and unreliable. It is an object of this invention to provide a hygrometer instrument operating on the absorption principle while giving readings of greatly improved accuracy over conventional instruments of that kind. Another object is to provide an absorption hygrometer wherein the transmission and magnification of the variations in length of the filiform hygroscopic element will be accomplished in an improved way, free from moving mechanical parts and capable of directly operating an electrical indicator at a remote point.

A further object of this invention lies in the provision of a condition sensing instrument in the form of a probe conveniently insertable into otherwise inaccessible locations for indicating the atmospheric conditions therein, e.g. into packaged goods. An additional object is to provide such a probe which will be capable of simultaneously indicating humidity and temperature, and hence also dew point.

In an important aspect of the invention there is provided a hygrometer assembly comprising in combination a support, a filiform hygroscopic element having one end part attached to the support, and a strain-gauge unit having one end part attached to the support, and means connecting the other end part of the filiform element and the other end part of the strain-gauge unit, whereby variations in length of the filiform element with atmospheric humidity will modify an electric characteristic of the strain-gauge unit, and indicating circuit means electrically connected with said strain-gauge unit for indicating said variations.

The various objects, features and advantages of the invention will become apparent from the ensuing description of an exemplary embodiment thereof illustrated in the accompanying drawings wherein:

FIG. 1 is a view of the improved condition-sensing probe in longitudinal section and schematically shows electrical indicating means connected thereto;

FIGS. 2, 3 and 4 are cross sections on lines II—II, III—III and IV—IV of FIG. 1, respectively.

The drawings are made to a greatly enlarged scale, and it is noted that in one practical embodiment of the invention the improved probe had outside dimensions of about 20 millimeters in length and 5.5 mm. in diameter.

The probe illustrated comprises an inner support or body generally designated 1 conformed to support the operating components of the device in a manner that will become later apparent. The outer surface of the body 1 is recessed as at 32 so as to permit of inserting over it an outer protective cover cap or hood 33 of generally cylindrical shape with an hemispherical outer end, as shown. The hood 33 is apertured as at 34 to allow air to enter freely into it and into contact with the humidity and temperature-sensing elements presently described. Further, the body 1 is formed at its inner end with a flange 31 and an axial shank 36 adapted for insertion into the outer end of a flexible tube 37 of rubber or suitable plastic, only partly shown. The outer surfaces of the hood 33, body flange 1 and flexible tube 37 are preferably formed flush with one another as shown, so that the probe constitutes in effect a smooth and continuous extension of the tube for easy insertion into a small space within which the characteristics of the atmosphere are to be indicated.

A strain-gauge assembly generally designated 3 has one of its end parts secured between a lateral boss 8 of body 1 and a clamping block 11 by means of a screw 12 threaded into a threaded hole in the boss and having its head seated in a recess of block 11. The strain-gauge assembly 3 is of the type adapted to exhibit a change in an electric characteristic thereof, e.g. resistance, with changes in the mechanical bending strain to which the assembly is exposed in the illustrated example, the assembly 3 includes a pair of elongated strain-gauge strips 4 and 5 having their one sides bonded with a suitable electrically insulating adhesive, such as an epoxy resin, to opposite surfaces of an intermediate thin steel strip 6. The resulting laminated assembly has one end part clamped between the mating surface of boss 8 and clamping block 11 as earlier indicated and is formed with a hole for the insertion of screw 12.

The opposite, free end of the laminated strain-gauge assembly 3 supports a laterally projecting bracket 14, e.g. by fitting the end of the laminated assembly 3 into a slot formed along a side edge of the bracket (also see FIG. 4). The bracket 14 is shown as having an aperture therein for weight reduction purposes, and its free end is shown notched for facilitating the attachment thereto of the one ends of a series of elongated filiform hygroscopic elements 15, which desirably may be human hairs, or other organic fibre adapted to vary appreciably in length with the amount of moisture absorbed by it from the surrounding atmosphere.

The upper ends of the hairs 15 are attached to similar notches formed in the laterally projecting end of a bracket 17 which is mounted for adjustable displacement in a longitudinal direction towards and away from the lower bracket 14, for which purpose the upper bracket 17 is grooved to present side flanges 17a, 17b slidably engaging the outer vertical sides of a longitudinal extension 18 of body 1. The longitudinal positional adjustment of upper bracket 17 is effected by means of a micrometer screw 21 having its threaded shank engaging a threaded hole formed in bracket 17 and having its head seated against the annular bottom surface 22 of a recess 23 formed in body 1. Further, the bracket 17 can be blocked in an adjusted position by means of a blocker screw 25 having its shank engaging a threaded hole 26 formed transversely in the body extension 18 and extending freely through a slot 27 formed in the bracket 17, the head of screw 25 being seated against the outer side surface of bracket 17.

Thus, with blocker screw 25 loosened, micrometer screw 21 can be rotated so as accurately to adjust the initial tension imparted to the array of filiform hygroscopic elements 15, and the adjusted initial tension is then maintained by tightening blocker screw 25.

The upper ends of the strain-gauge strips 4 and 5 and the intermediate strip 6 have soldered thereto the ends of respective electric conductors 42, 43, 44 which extend upwards through an insulating conduit 41 fitted in an axial bore 39 of the aforementioned axial shank portion 36 of body 1 and then through the flexible tube or conduit 37. The upper ends of the leads 42, 43, 44 are connected to any suitable electrical indicator device schematically shown at 45, and which may comprise a conventional balanceable Wheatstone resistance bridge, two of the four legs of which may constitute or include the strain-gauge strips 4 and 5, respectively.

In the illustrated embodiment of the invention the probe further includes temperature sensing means therein, in the form of a semi-conductor element 51 of the type undergoing appreciable changes in the electrical resistance thereof with changes in the temperature of the element. This element 51 is supported in the lower end section of the probe from the ends of a pair of leads 52, 53 which extend through longitudinal grooves 54, 55 formed in the sides of the body 1 and thence up through insulating conduit 41 and flexible tube 37. The leads 52, 53 are connected to an electrical indicating instrument schematically indicated at 57, e.g. also of the Wheatstone bridge type.

In operation, after the initial tension of the hygroscopic elements 15 has first been pre-adjusted in the manner described above, and the indicating devices suitably calibrated in accordance with conventional procedures, any subsequent change in the degree of humidity of the atmosphere in which the probe is inserted will cause a corresponding change in the free length of the filiform elements 15 and hence will act through lower bracket 14 to alter the flexional strain in the strain-gauge assembly 3. Thus, on decrease in length or shrinkage of the hairs 15, the near strain-gauge strip 5 will be compressed and the far strain-gauge strip 4 will be tensioned, the strain-gauge assembly 3 as a whole flexing to accommodate the shrinkage of the hairs 15. There will be corresponding opposed variations in the electrical resistance of the strain-gauge strips 4 and 5 and hence a change in the indication given by electrical indicating instrument 45. Concurrently, the resistance of temperature-sensing element 51 will also vary in accordance with any changes in the temperature of the atmosphere to which the probe is exposed, and the indicating instrument 57 will indicate such changes in temperature. The readings of instruments 45 and 57 may readily be combined, either by ordinary mental computation or automatically by conventional analogue computing means (not shown) to provide an indication of the dew point, should this be desired.

It will thus be apparent that the invention has provided an extremely convenient and practical probe assembly which is simple and compact and highly suitable for taking readings in relatively inaccessible locations, and wherein the variations in length of an absorption-type hydroscopic sensing element are magnified and converted to electrical readings in a novel manner, for convenient transmission to a remote indicating station; concurrently, the probe has provision for temperature indication without substantially increasing the space requirements and complication of the probe.

It will be obvious that various modifications may be introduced into the specific embodiment shown and described by way of example without exceeding the scope of the invention.

What is claimed is:

1. A hygrometer assembly comprising in combination an elongated hygroscopic element capable of changing its length with changes in the degree of humidity to which it is exposed,
an electrical strain-gauge unit,
means interconnecting said hygroscopic element and said electrical strain-gauge unit so that length variations of said element will vary the electrical resistance in said electrical strain-gauge unit, and
means connected with the strain-gauge unit and responsive to variations of the electrical resistance thereof.

2. A hygrometer assembly comprising in combination a support,
a filiform hygroscopic element having one end attached to the support,
a strain-gauge unit having one end attached to the support,
and means interconnecting the other end of the filiform element and the other end of the strain-gauge unit so that variations in length of the filiform element with humidity will modify the mechanical strain to which said strain-gauge unit is exposed, and hence will vary an electrical characteristic of said strain-gauge unit, and
an electrical indicating device connected with said strain-gauge unit for indicating said variations.

3. The assembly defined in claim 2, wherein said strain-gauge unit comprises at least one strip-like strain-gauge extending from said support in a direction generally parallel with that of the filiform element and said interconnecting means comprises an arm extending laterally from a free end part of the strain-gauge and having said other end of the filiform element attached thereto, whereby length variations in the filiform element will modify the bending strain of said strip-like strain-gauge.

4. The assembly defined in claim 3, wherein the strain-gauge unit comprises a pair of strip-like strain-gauges having opposite surfaces bonded to create opposite extension and compression strains in the respective strain-gauges when said unit is exposed to bending.

5. The assembly defined in claim 4, wherein said strip-like strain gauges have their opposite surfaces bonded through an electrically insulating adhesive with opposite surfaces of an electrically conductive intermediate supporting strip.

6. A hygrometer assembly comprising
a support,
a filiform hygroscopic element,
an adjustable attaching member having one end of said filiform element attached thereto,
means for adjusting the position of said member relative to said support in a direction generally parallel with the direction of said filiform element,
a generally straight, elastically flexible strain-gauge assembly having one end secured to said support and projecting therefrom in a direction generally parallel to said first direction,
means projecting laterally from an end of said strain-gauge assembly remote from said one end thereof, said projecting means having another end of said filiform element attached thereto,
whereby length variations in said filiform element will vary the elastic bending strain in said strain-gauge assembly, and
electrical means connected with said strain-gauge assembly and responsive to variations in bending strain therein.

7. A condition-sensing probe assembly comprising in combination
(1) an elongated conduit,
(2) a probe unit mounted from an end of said conduit and comprising
 (a) a support,
 (b) a filiform hygroscopic element having an end attached to said support,
 (c) a strain-gauge assembly having an end attached to the support, and
 (d) means interconnecting the other ends of said filiform element and strain-gauge assembly whereby variations in length of the filiform hygroscopic element with humidity will modify the strain to which said assembly is exposed and consequently vary an electrical characteristic thereof,
(3) an electrical indicating device responsive to said characteristic, and
(4) electric conductor means connecting said strain-gauge assembly with said indicating device and extending through said conduit.

8. The assembly defined in claim 7, including an elongated cover for said probe unit surrounding said support and the parts supported therefrom, and perforations in said cover to allow entry of external air into contact with said filiform element.

9. A condition-sensing probe assembly comprising in combination
(1) a flexible conduit,
(2) a probe unit mounted from an end of the conduit and comprising
 (a) a support,
 (b) a filiform hygroscopic element having an end attached to the support,
 (c) a strain-gauge assembly having an end attached to the support,
 (d) means interconnecting said hygroscopic element and strain-gauge assembly for converting length variations in the hygroscopic element with humidity into strain variations in said strain-gauge assembly and consequent variations in an electrical characteristic of said assembly, and
 (e) a temperature-sensing element attached to said support being of the type having an electrical characteristic thereof varying with temperature,
(3) a first electrical indicating device responsive to said electric characteristic of the strain-gauge assembly,
(4) a second electrical indicating device responsive to said electric characteristic of the temperature sensing element, and
(5) electric conductor means interconnecting said strain-gauge assembly with said first indicating device and said temperature sensing element with said second indicating device and extending through said flexible conduit.

References Cited

UNITED STATES PATENTS

| | | | |
|---|---|---|---|
| 2,856,774 | 10/1958 | Dean | 73—337.5 |
| 1,828,702 | 10/1931 | Foo | 73—337.5 X |
| 2,010,148 | 8/1935 | Goss | 73—337.5 |
| 2,044,086 | 6/1936 | Lewis | 73—337.5 |
| 2,105,683 | 1/1938 | Burdick | 73—337.5 X |
| 2,122,000 | 6/1938 | Beasley et al. | 73—337.5 X |
| 2,235,954 | 3/1941 | Whitney et al. | 73—337.5 X |

LOUIS R. PRINCE, *Primary Examiner.*

JEFFREY NOLTON, *Assistant Examiner.*